(12) United States Patent
Park

(10) Patent No.: US 6,643,437 B1
(45) Date of Patent: Nov. 4, 2003

(54) ALL-DIELECTRIC SELF-SUPPORTING OPTICAL CABLE AND MANUFACTURING METHOD THEREOF

(75) Inventor: Kyung-Tae Park, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/448,416

(22) Filed: Nov. 23, 1999

(30) Foreign Application Priority Data

Nov. 23, 1998 (KR) .............................................. 98-50228

(51) Int. Cl.⁷ ................................................ G02B 6/44
(52) U.S. Cl. ...................... 385/101; 385/107; 174/45 R
(58) Field of Search .................. 174/45 R; 385/100–114

(56) References Cited

U.S. PATENT DOCUMENTS

| | | | |
|---|---|---|---|
| 4,155,963 A | | 5/1979 | de Vecchis et al. |
| 4,832,442 A | * | 5/1989 | Papas |
| 5,230,034 A | | 7/1993 | Bottoms, Jr. et al. |
| 5,317,665 A | * | 5/1994 | Herrebrugh |
| 5,325,457 A | | 6/1994 | Bottoms, Jr. et al. |
| 5,513,292 A | | 4/1996 | Rowland et al. |
| 5,526,457 A | | 6/1996 | Rowland et al. |
| 5,563,976 A | | 10/1996 | Rowland |
| 5,606,636 A | | 2/1997 | Rowland et al. |
| 5,758,005 A | * | 5/1998 | Yoshida ..................... 385/136 |
| 6,127,625 A | * | 10/2000 | Castano |

OTHER PUBLICATIONS

*First Office Action dated Nov. 15, 2002 of Patent Office of the People's Republic of China.*
*Text of the First Office Action dated Nov. 15, 2002 of Patent Office of the People's Republic of China.*

* cited by examiner

*Primary Examiner*—Hung N. Ngo
(74) *Attorney, Agent, or Firm*—Robert E. Bushnell, Esq.

(57) ABSTRACT

Disclosed are an all-dielectric self-supporting optical cable and a manufacturing method thereof. The all-dielectric self-supporting (ADSS) optical cable installed on an extra-high voltage electrical power transmitting pylon comprises a first armor rod made of metal material and connected to a dead end of the all-dielectric self-supporting optical cable; and an insulating member for insulating the first armor rod.

43 Claims, 4 Drawing Sheets

ALL-DIELECTRIC SELF-SUPPORTING OPTICAL CABLE AND MANUFACTURING METHOD THEREOF

CLAIM OF PRIORITY

This application makes reference to, incorporates the same herein, and claims all benefits accruing under 35 U.S.C. § 119 from an application entitled ALL-DIELECTRIC SELF-SUPPORTING OPTICAL CABLE AND MANUFACTURING METHOD THEREOF earlier filed in the Korean Industrial Property Office on the 23$^{rd}$ day of November 1998, and there duly assigned Ser. No. 50228/1998, a copy of which is annexed hereto.

BACKGROUND OF THE INVENTION

1. Technical Field

The present invention relates to an optical cable, and more particularly, to a design for an all-dielectric self-supporting optical cable which is a type of an all-dielectric cable installed together with an extra-high voltage electrical power line.

2. Related Art

An overhead cable is installed along an aerial route using towers, poles, and structures of a building, for example. In the overhead cable, because weight of the overhead cable is concentrated to a securing portion on a structure, a method for supporting the overhead cable by a multitude of supporting wires can be used. In this case, most of the tension load which is generated due to the weight of the overhead cable is sustained by the multitude of wires. In the meanwhile, in the case of a composite fiber overhead ground wire (OHGW), a cable body can be structured in a manner such that it can sustain the tension load by itself.

I have found that a sheath of an all-dielectric self-supporting (ADSS) optical cable can be damaged under certain conditions. Efforts have been made to improve optical cables.

Exemplars of recent efforts in the art include U.S. Pat. No. 5,606,636 for optical cable for avoiding dri-band arcing, issued to Rowland et al.; U.S. Pat. No. 5,513,292 for overhead optical transmission system, issued to Rowland et al.; U.S. Pat. No. 5,526,457 for method and apparatus for preventing dry band arcing in a combined overhead electrical power and optical transmission system, issued to Rowland et al.; U.S. Pat. No. 5,230,034 for all dielectric self-supporting fiber optic cable, issued to Bottoms, Jr. et al.; U.S. Pat. No. 5,325,457 for field protected self-supporting fiber optic cable, issued to Bottoms, Jr. et al.; U.S. Pat. No. 5,563,976 for semiconductive linear element including partially pyrolised polyacrylonitrile, issued to Rowland; and U.S. Pat. No. 4,155,963 for in-line manufacture of optical fibers cables with sequential laying, issued to de Vecchis et al.

While these recent efforts provide advantages, I note that they fail to adequately provide an improved all-dielectric self-supporting optical cable and manufacturing method thereof.

SUMMARY OF THE INVENTION

Accordingly, an object of the invention is to solve problems related to optical cables. A further object of the present invention is to provide an all-dielectric self-supporting (ADSS) optical cable and a manufacturing method thereof, in which a distal end of an armor rod is insulated by an insulating member, whereby a sheath of the all-dielectric self-supporting cable is prevented from being damaged by free electrons of the armor rod, when an electric field intensity between water droplets which are brought into electrification with the distal end of the armor rod by rainfall, dewdrops, etc. including ions due to a salty gradient and environmental pollution exceeds a dielectric breakdown strength of air, by the fact that an electric field at a dead end of the all-dielectric self-supporting cable is bent in a horizontal direction under the influence of a pylon, the ground and the dead end (including the armor rod) of the all-dielectric self-supporting cable.

In order to achieve the above objects and others, according to the present invention, there is provided an all-dielectric self-supporting optical cable installed on an extra-high voltage electrical power transmitting pylon, comprising: a first armor rod made of metal material and connected to a dead end of the all-dielectric self-supporting optical cable; and an insulating member for insulating the first armor rod.

According to another aspect of the present invention, there is provided a method for manufacturing all-dielectric self-supporting optical cable installed on an extra-high voltage electrical power transmitting pylon, the method comprising the steps of: connecting a dead end of the all-dielectric self-supporting optical cable and a first armor rod made of metal material with each other, thereby to connect the all-dielectric self-supporting optical cable to the extra-high voltage electrical power transmitting pylon; and insulating the first armor rod connected to the dead end of the all-dielectric self-supporting optical cable with an insulating member.

To achieve these and other objects in accordance with the principles of the present invention, as embodied and broadly described, the present invention provides an apparatus, comprising: an all-dielectric self-supporting optical cable being installed on an extra-high voltage electrical power transmitting pylon; a first armor rod including conducting material and being connected to an end of said all-dielectric self-supporting optical cable; an insulating member insulating said first armor rod; and a second armor rod including insulating material and surrounding said all-dielectric self-supporting optical cable by a predetermined length starting from an end of a portion of said all-dielectric self-supporting optical cable which is insulated by said insulating member.

To achieve these and other objects in accordance with the principles of the present invention, as embodied and broadly described, the present invention provides a method, comprising: manufacturing an all-dielectric self-supporting optical cable installed on an extra-high voltage electrical power transmitting pylon; connecting an end of said optical cable with a first armor rod including conductive material to connect said optical cable to the pylon; and insulating said first armor rod connected to said end of said optical cable with an insulating member.

To achieve these and other objects in accordance with the principles of the present invention, as embodied and broadly described, the present invention provides an apparatus, comprising: an all-dielectric self-supporting optical cable being installed on an extra-high voltage electrical power transmitting pylon; a first armor rod including conducting material and being connected to an end of said all-dielectric self-supporting optical cable; an insulating member insulating said first armor rod; and a second armor rod including insulating material and surrounding a predetermined length of said optical cable.

The present invention is more specifically described in the following paragraphs by reference to the drawings attached

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
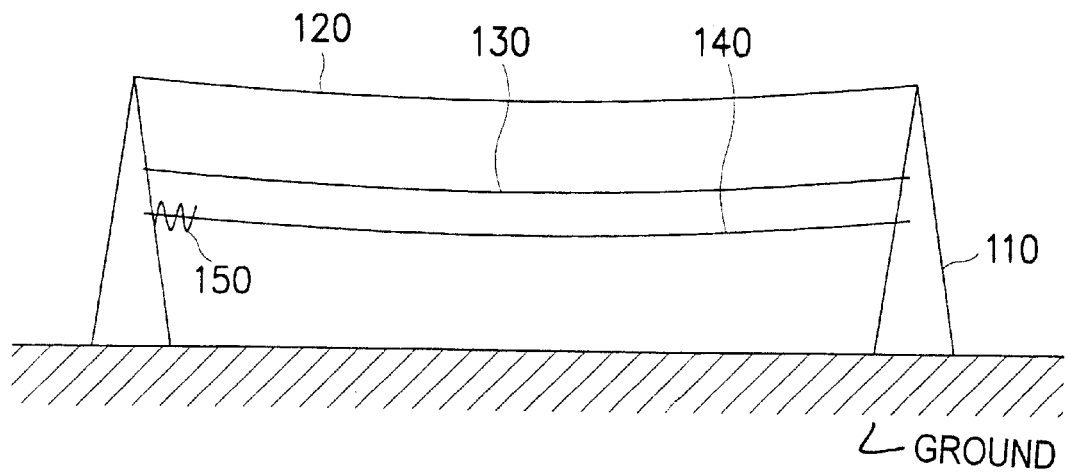
FIG. 1 is a view illustrating a state wherein an all-dielectric self-supporting cable is installed on a pylon.

Consider a cable of the type which is supported by the multitude of supporting wires, a cable which is hung by means of a hanger on the supporting wires already installed and a self-supporting cable which has a supporting construction integrally formed therewith. FIG. 1 is a view illustrating a state wherein an all-dielectric self-supporting cable is installed on a pylon.

An overhead ground wire (OHGW) 120 is installed at an uppermost portion of an extra-high voltage electrical power transmitting pylon 110, an electrical power line 130 is installed below the overhead ground wire 120, and an all-dielectric self-supporting (ADSS) cable 140 is installed below the electrical power line 130. The all-dielectric self-supporting cable 140 is secured to the extra-high voltage electrical power transmitting pylon 110 by an armor rod 150.

Figure 2:
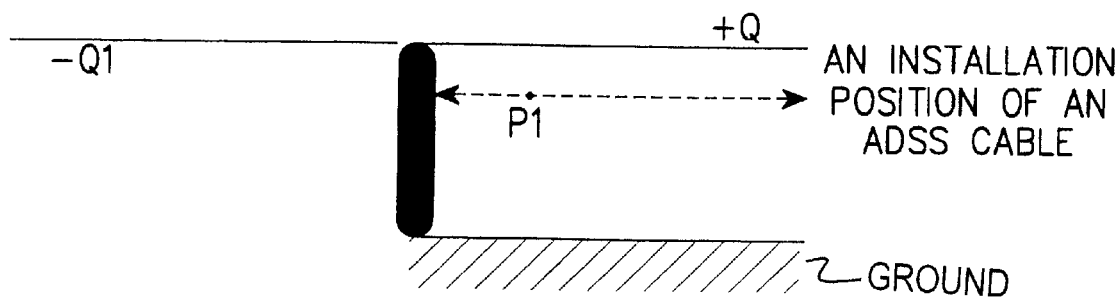
FIG. 2 is a view illustrating a position of an image electrical charge by a pylon, the ground and an origin depending upon an installation position of the all-dielectric self-supporting cable.

FIG. 2 is a view illustrating an electric field which depends upon an installation position of the all-dielectric self-supporting (ADSS) cable. An electric field at a point P1 is represented by the sum of electric fields which are created by a +Q charge due to the electrical power line and by image electrical charges due to the pylon (−Q), the ground (−Q2) and origin (+Q). An electric field at a dead end of the all-dielectric self-supporting cable is bent in a horizontal direction by the pylon, the ground and a metal (an armor rod) provided to the dead end of the all-dielectric self-supporting (ADSS) cable. The dead end of the ADSS cable can correspond to the point of the cable at which mechanical force and longitudinal strain are applied to a reliable support. The dead end is an end such as a terminal, termination, or an anchor point. The dimension and direction of the electric field at an installation position of the all-dielectric self-supporting cable are denoted by an integrated sum for a line segment of the electrical power line.

Figure 3:
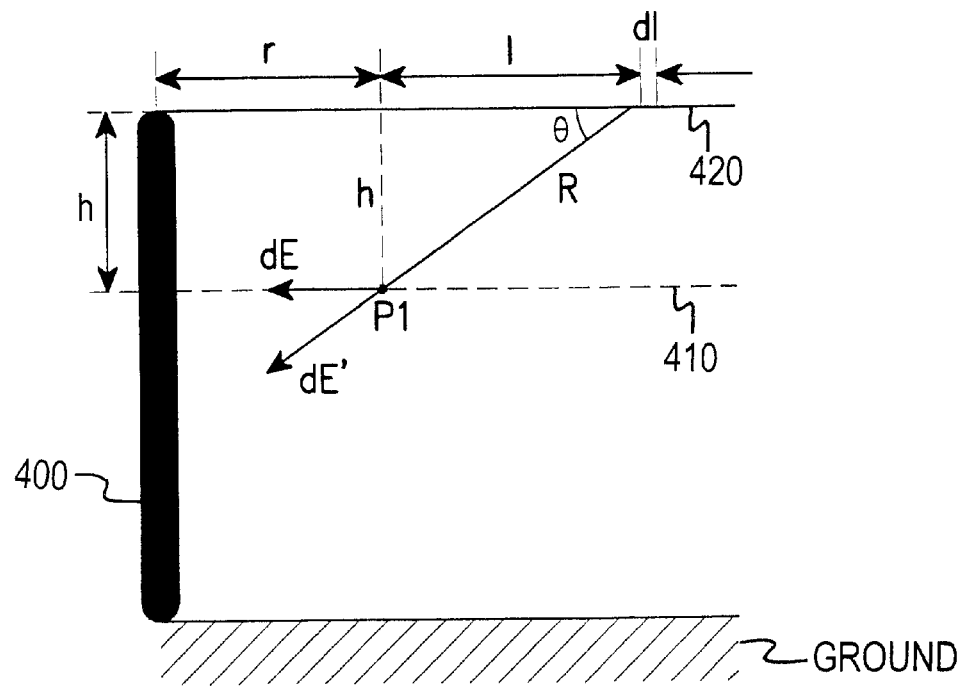
FIG. 3 is a view illustrating a dimension of an electric field depending upon an installation position of the all-dielectric self-supporting cable.

Hereinafter, dimensions and the direction of the electric field which depend upon an installation position of the all-dielectric self-supporting cable will be described in detail by reference to FIG. 3. Equation 1 is as follows:

$$\vec{E}_{Pl} = \int_0^{span} d\vec{E}_{Pl} \cos\theta = \int_0^{span} \frac{\rho_l dl \cos\theta}{4\pi\varepsilon_0 R^2} = \qquad (1)$$

$$= \frac{\rho_l}{4\pi\varepsilon_0} \int_{\theta_1}^{\theta_2} \frac{h\tan^2\theta d\theta \cos\theta}{h^2 \tan^2\theta}$$

$$= \frac{\rho_l}{4\pi\varepsilon_0} \int_{\theta_1}^{\theta_2} \frac{\cos\theta d\theta}{h} = \frac{\rho_l}{4\pi\varepsilon_0} [\sin\theta]_{\theta_1}^{\theta_2}$$

As shown above in Equation 1, r is a distance between the pylon 400 extending perpendicularly from the ground, and the point P1, l is a distance between the point P1 and a distal end of the electrical power line, h is a height between the electrical power line 420 represented by a solid line, and the all-dielectric self-supporting cable 410 represented by the dashed line, $\rho_l$ is a line charge density, and the span is an entire length of the electrical power line between two pylons. Additional components included in Equation 1 are further defined in Equations 2, 3, and 4 shown below.

$$R^2 = h^2 + l^2 = h^2(1+\sec^2\theta) = h^2 \tan^2\theta \qquad (2)$$

$$l = h \sec\theta dl = h \tan^2\theta d\theta \qquad (3)$$

$$\theta 1 = \left(180 - a\tan\frac{h}{r}\right) \qquad (4)$$

$$\theta 2 = a\tan\left(\frac{h}{span - r}\right)$$

and the span is an entire length of the electrical power line between two pylons.

Figure 4:
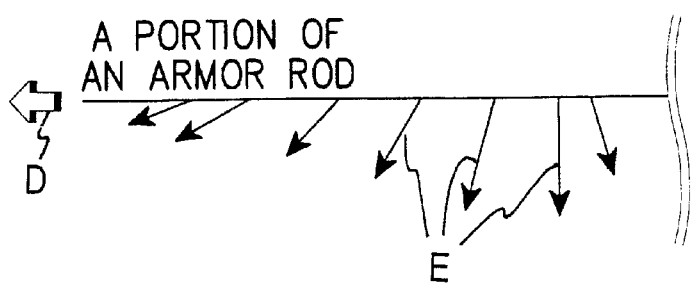
FIG. 4 is a view illustrating a state wherein an electric field which is outputted from an electrical power line is changed in its direction and dimension along a surface axis of the all-dielectric self-supporting cable under the influence of the pylon, the ground and an armor rod of the all-dielectric self-supporting cable.

FIG. 4 illustrates a state wherein arrow D indicates the direction to pylon 400, an electric field $\vec{E}_P$ from the electrical power line is changed in its direction and dimension along a surface axis of the all-dielectric self-supporting cable under the influence of the pylon 400, the ground and an armor rod of the all-dielectric self-supporting cable. Tracking of a sheath of the all-dielectric self-supporting cable proceeds by an electric field of a portion of the armor rod in a horizontal direction. The tracking can correspond to irreversible degradation of surface material from the formation of conductive carbonized paths. Accordingly, when approaching pylon 400, the arrows E representing the electrical field bend toward the horizontal direction, that is, toward pylon 400, and ultimately tend to be approximately parallel to arrow D. Accordingly, when approaching the pylon along the all-dielectric self-supporting cable, the electric field is concentrated at the end portion of the armor rod.

Figure 5:
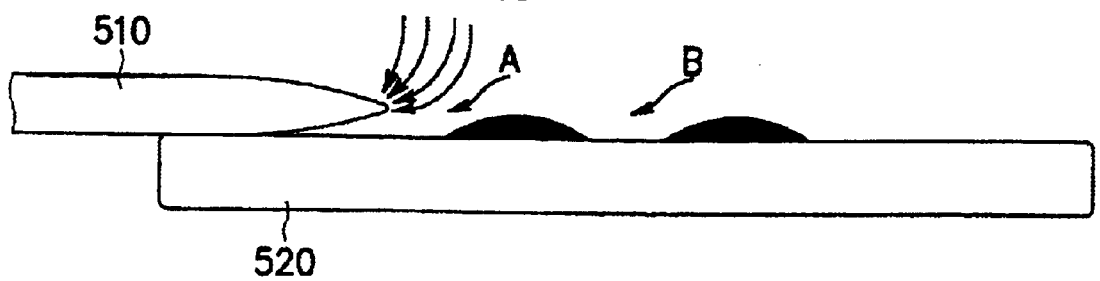
FIG. 5 is a view illustrating a state wherein, when salty water or moisture including ions exists on a surface of the all-dielectric self-supporting cable, an electric field is formed by electrification between them.

FIG. 5 is a view illustrating a state wherein, when salty water or moisture including ions exists on a surface of the all-dielectric self-supporting cable, an electric field is formed by electrification between them.

A dimension and a direction of an electric field $\vec{E}_{A-sum}$ at a portion A are denoted by a vector sum between $\vec{E}_A$ which is determined by the shape (a radius of curvature) of an individual drop of moisture, an ion concentration, a curvature at a distal end of the armor rod and a separation distance, and $\vec{E}_{PA}$ which is formed in a space between the armor rod and the individual drop of moisture by the electrical power line as shown in Equation 5:

$$\vec{E}_{A-sum} = \vec{E}_A + \vec{E}_{PA} \qquad (5)$$

If the electric field of $\vec{E}_{A-sum}$ exceeds a dielectric breakdown strength of air, the sheath of the all-dielectric self-supporting cable is damaged due to entrance of free electrons of a metal piece.

A dimension and a direction of an electric field $\vec{E}_{B-sum}$ at a portion B are denoted by a vector sum between $\vec{E}_B$ which is determined by the shape of an individual drop of moisture, an ion concentration, and a separation distance between individual drops of moisture, and $\vec{E}_{PB}$ which is formed in a space between individual drops of moisture by the electrical power line as shown in Equation 6.

$$\vec{E}_{b-sum} = \vec{E}_B + \vec{E}_{PB} \qquad (6)$$

If the electric field of $\vec{E}_{B-sum}$ exceeds a dielectric breakdown strength of air, although entrance of free electrons as in the case of the armor rod does not occur, the sheath of the all-dielectric self-supporting cable is damaged due to an electrostatic phenomenon.

Accordingly, the electric field at the dead end of the all-dielectric self-supporting cable which is installed on the extra-high voltage electrical power transmitting pylon, is bent in the horizontal direction under the influence of the pylon, the ground and the dead end of the all-dielectric self-supporting cable. Therefore, an electric field intensity between water droplets which are brought into electrification with the distal end of the armor rod by rainfall, dewdrops, etc. including ions due to a salty gradient and environmental pollution, causes a dielectric breakdown of air. As a result, a problem is caused in that the sheath of the all-dielectric self-supporting cable is damaged by the free electrons of the armor rod.

Reference will now be made in greater detail to the other embodiments of the present invention. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

Figure 6:
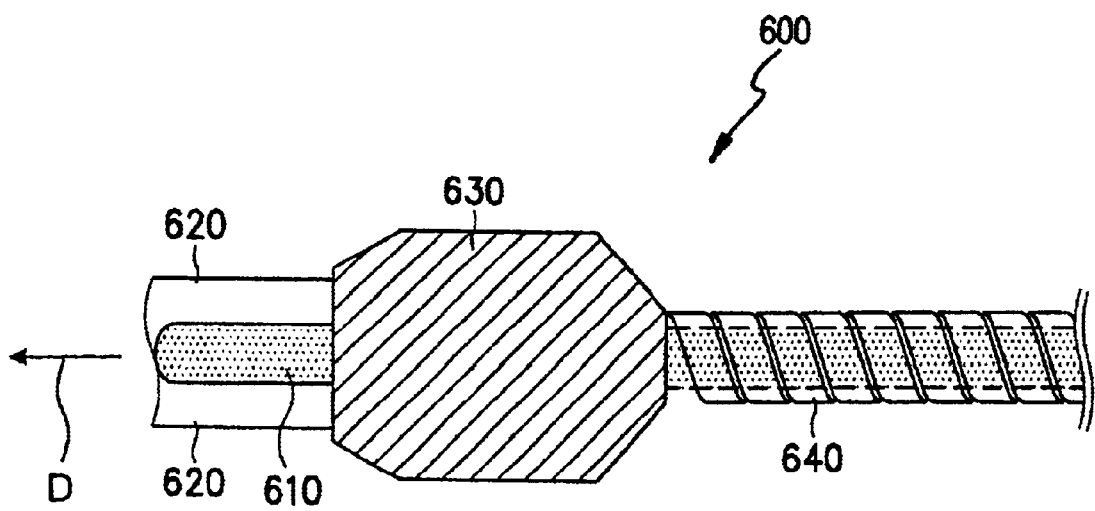
FIG. 6 is a view illustrating a structure of an all-dielectric self-supporting cable, in accordance with the principles of the present invention.

FIG. 6 illustrates an embodiment of an all-dielectric self-supporting cable constructed in accordance with the principles of the present invention, wherein arrow D indicates the direction to pylon 400. An all-dielectric self-supporting cable combination 600 may include an all-dielectric self-supporting cable 610, a first armor rod 620 that is connected to the pylon (not shown in FIG. 6), an insulating member 630 and a second armor rod 640.

The all-dielectric self-supporting (ADSS) cable 610 is a kind of an all-dielectric cable that may be installed together with an extra-high voltage electrical power line. The all-dielectric self-supporting cable 610 serves as a self-supporting cable. The first armor rod 620 is made of conductive metal material and serves as means for connecting an extra-high voltage electrical power transmitting pylon and the all-dielectric self-supporting cable 610 with each other, thereby installing the all-dielectric self-supporting cable 610 on the extra-high voltage electrical power transmitting pylon. The insulating member 630 insulates the first armor rod 620 which is connected to a dead end of the all-dielectric self-supporting cable 610, and is made of high resistant material such as polymer, rubber or the like. The second armor rod 640 is made of insulating material. The second armor rod 640 surrounds, by being twisted, the all-dielectric self-supporting cable 610 by a predetermined length starting from an end of a portion of the all-dielectric self-supporting cable 610 which is insulated by the insulating member 630.

Hereinafter, the present invention will described in a further detail on the basis of the construction aforementioned above. In order to connect the all-dielectric self-supporting cable 610 to the extra-high voltage electrical power transmitting pylon, the dead end of the all-dielectric self-supporting cable 610 and the first armor rod 620 made of metal material are connected with each other. The first armor rod 620 which is connected to the dead end of the all-dielectric self-supporting cable 610, is insulated by the insulating member 630. The insulating member 630 is made of high resistant material such as polymer, rubber or the like. Further, the all-dielectric self-supporting cable 610 is surrounded, by twisting the second armor rod 640 made of insulating material, by the predetermined length starting from the end of the portion of the all-dielectric self-supporting cable 610 which is insulated in a state wherein the first armor rod 620 made of metal material is coupled to the dead end of the all-dielectric self-supporting cable 610.

Since the first armor rod 620 is insulated by the insulating member 630, free electrons are prevented from entering into the all-dielectric self-supporting cable 610 due to the presence of the first armor rod 620. According to this, an electric field intensity between water droplets which are brought into electrification with a distal end of the first armor rod 620 by rainfall, dewdrops, etc. including ions due to a salty gradient and environmental pollution cannot cause a dielectric breakdown of air due to the fact that an electric field at the dead end of the all-dielectric self-supporting cable 610 is bent in a horizontal direction under the influence of a pylon, the ground and the dead end (including the first armor rod 620) of the all-dielectric self-supporting cable 610.

Consequently, an electric field $\vec{E}_P$ emanating from the electrical power line, prevents tracking of a sheath of the all-dielectric self-supporting cable 610 from proceeding due to a horizontal electric field at a portion of the first armor rod 620. It may be noted that the electric field bends towards the horizontal direction due to an interaction of the pylon, the ground and the armor rod. Consequently, the electric field exhibits an increasing bend toward the pylon as the all-dielectric self-supporting cable approaches the pylon.

Also, by the fact that the all-dielectric self-supporting cable 610 is surrounded, by twisting the second armor rod 640, by the predetermined length starting from the end of the portion of the all-dielectric self-supporting cable 610 which is insulated in a state wherein the first armor rod 620 is coupled to the dead end of the all-dielectric self-supporting cable 610, it is possible to prevent the sheath of the all-dielectric self-supporting cable 610 from being damaged due to insulation between electrified individual drops of moisture.

Figure 7:
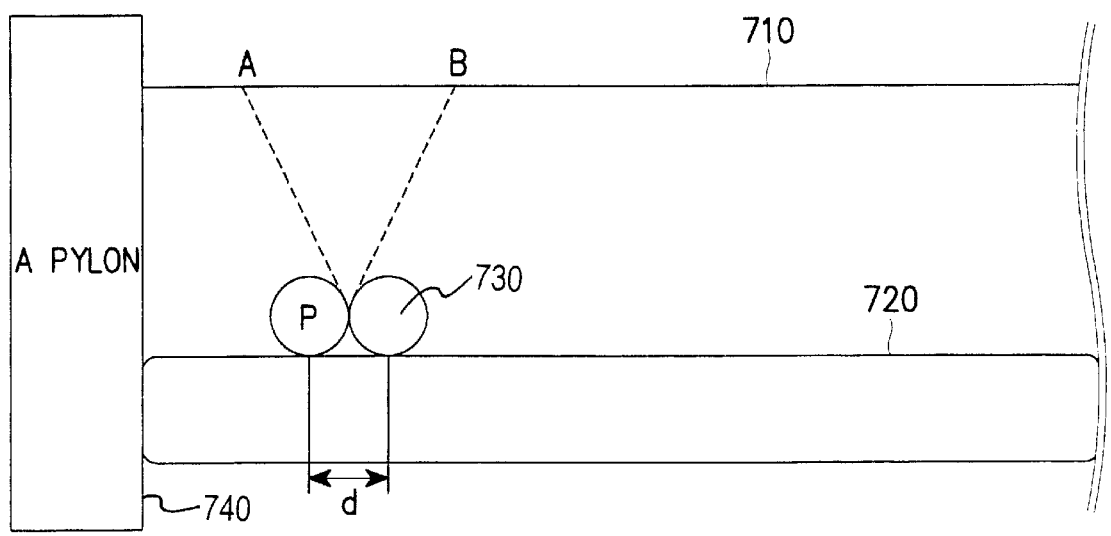
FIG. 7 is a view illustrating a state wherein the all-dielectric self-supporting cable according to the principles of the present invention is installed on a pylon together with an electrical power line.

FIG. 7 illustrates a relationship between the second armor rod 730 which surrounds, by being twisted, the sheath of the all-dielectric self-supporting cable (i.e., the ADSS cable) 720 and the electrical power line 710 extending from pylon 740. A dimension and a direction of an electric field at a point P of the second armor rod 730 which is made of insulating material and surrounds by being twisted the sheath of the all-dielectric self-supporting cable 720, are influenced not by the entire length of the electrical power line 710, but by the length of the electrical power line 710 from a point A to a point B. Therefore, the dimension of the electric field is reduced and the direction of the electric field is maintained vertical.

As can be readily seen from the aforementioned Equation 1, the dimension and the direction of the electric field at the point P of the second armor rod 730 made of insulating material vary depending upon a span of the electrical power line 710. Hence, if the span of the electrical power line 710 is lengthened, the electric field influencing the all-dielectric self-supporting cable 720 is increased. Thus, an electric field intensity by which the electrical power line 710 exerts influence on the all-dielectric self-supporting cable 720 by a pitch d of the second armor rod 730 made of insulating material, is restricted by the line segment AB of the electrical power line 710. Further, by the fact that the second armor rod 730 surrounds by being twisted a portion of the all-dielectric self-supporting cable 720 which is adjacent the pylon where the electric field intensity in the horizontal direction is large, a distance between individual drops of moisture is increased, and in a certain portion, the horizontal electric field is converted into a vertical direction.

As described above, by the present invention, advantages are provided in that, since a first armor rod made of metal material and connected to a dead end of an all-dielectric self-supporting cable is insulated by an insulating member, a sheath of the all-dielectric self-supporting cable is prevented from being damaged due to entrance of free electrons, whereby long-term reliability is ensured. Furthermore, because a second armor rod made of insulating material surrounds, by being twisted, the all-dielectric self-supporting cable by a predetermined length starting from an end of a portion of the all-dielectric self-supporting cable which is insulated, the sheath of the all-dielectric self-supporting cable is prevented from being damaged due to dielectric breakdown of air which exists between electrified individual drops of moisture, whereby long-term reliability is ensured.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
    an all-dielectric self-supporting optical cable being installed on an extra-high voltage electrical power transmitting pylon;
    a first armor rod including conducting material and being connected to an end of said all-dielectric self-supporting optical cable;
    an insulating member insulating said first armor rod; and
    a second armor rod including insulating material and surrounding said all-dielectric self-supporting optical cable by a predetermined length starting from an end of a portion of said all-dielectric self-supporting optical cable which is insulated by said insulating member.

2. The apparatus of claim 1, further comprising said conducting material corresponding to a metal material.

3. The apparatus of claim 1, further comprising said end of said optical cable corresponding to an anchor point of said optical cable.

4. The apparatus of claim 1, further comprising said end of said optical cable corresponding to a termination of said optical cable.

5. The apparatus of claim 1, further comprising said end of said optical cable being located where said optical cable is installed on the pylon.

6. The apparatus of claim 1, further comprising said second armor rod surrounding said optical cable by being twisted around said optical cable.

7. The apparatus of claim 1, said insulating member having a highly resistant material including at least one selected from among polymer and rubber.

8. The apparatus of claim 1, further comprising said second armor rod surrounding said optical cable by being twisted around said optical cable, said first armor rod separating said insulating member from said pylon.

9. A method, comprising:
    manufacturing an all-dielectric self-supporting optical cable installed on an extra-high voltage electrical power transmitting pylon;
    connecting an end of said optical cable with a first armor rod including conductive material to connect said optical cable to the pylon; and
    insulating said first armor rod connected to said end of said optical cable with an insulating member, separating said insulating member from the pylon with said first armor rod.

10. An apparatus, comprising:
    an all-dielectric self-supporting optical cable being installed on an extra-high voltage electrical power transmitting pylon;
    a first armor rod including conducting material and being connected to an end of said all-dielectric self-supporting optical cable;
    an insulating member insulating said first armor rod; and
    a second armor rod including insulating material and surrounding a predetermined length of said optical cable;
    said second armor rod surrounding said optical cable at a position starting from a portion of said optical cable which is insulated by said insulating member;
    said end of said optical cable being located adjacent to where said optical cable is installed on the pylon; and
    said conducting material corresponding to a metal material.

11. A method, comprising:
    manufacturing an all-dielectric self-supporting optical cable installed on an extra-high voltage electrical power transmitting pylon;

connecting an end of said optical cable with a first armor rod including conductive material to connect said optical cable to the pylon; and insulating said first armor rod connected to said end of said optical cable with an insulating member, said end of said optical cable corresponding to an anchor point of said optical cable, separating said insulating member from said pylon with said first armor rod.

12. A method, comprising:

connecting an optical cable to a pylon, said connecting being performed at least partly by a first armor rod including conductive material;

insulating said first armor rod with an insulating member; and installing a second armor rod around an outer surface of a length of said optical cable, said length of said optical cable starting at said insulating member, said second armor rod including insulating material.

13. The method of claim 12, further comprising separating said insulating member from said pylon with said first armor rod.

14. The method of claim 12, further comprising surrounding a portion of said optical cable with said insulating member.

15. A method, comprising:

connecting a portion of an optical cable to a pylon with a first armor rod including conductive material;

contacting said first armor rod with an insulating member; and installing a second armor rod on an outer surface of a length of said optical cable, said length of said optical cable starting adjacent to said insulating member.

16. The method of claim 15, said second armor rod including insulating material.

17. The method of claim 15, further comprising separating said insulating member from said pylon with said first armor rod.

18. The method of claim 15, further comprising surrounding a portion of said optical cable with said insulating member.

19. An apparatus, comprising:

a first armor rod including conductive material connecting an optical cable to a pylon;

an insulating member insulating said first armor rod; and a second armor rod installed on an outer surface of said optical cable at a position starting at said insulating member.

20. The apparatus of claim 19, said first armor rod separating said insulating member from said pylon.

21. The apparatus of claim 19, said insulating member surrounding a portion of said optical cable.

22. The apparatus of claim 19, said second armor rod including insulating material.

23. A method, comprising:

manufacturing an all-dielectric self-supporting optical cable installed on an extra-high voltage electrical power transmitting pylon;

connecting an end of said optical cable with a first armor rod including conductive material to connect said optical cable to the pylon;

insulating said first armor rod connected to said end of said optical cable with an insulating member; and surrounding a predetermined length of said optical cable by twisting a second armor rod around said optical cable, said surrounding starting from a portion of said optical cable which is insulated in a state wherein said first armor rod is coupled to said end of said optical cable.

24. The method of claim 23, said second armor rod including insulating material.

25. The method of claim 24, further comprising said end of said optical cable corresponding to a termination of said optical cable.

26. The method of claim 24, further comprising said end of said optical cable being located where said optical cable is installed on the pylon.

27. The method of claim 24, further comprising said conductive material corresponding to a metal material.

28. An apparatus for suspending an optical cable from a pylon, comprising:

a first rod being connected to a pylon and being connected to a first terminal end of an optical cable, said first rod coupling the first terminal end of said optical cable to the pylon, said first rod including electrically conductive materials;

an insulator being connected to said first rod, said insulator insulating said first rod, said insulator surrounding and insulating a first predetermined length of the optical cable; and a second rod surrounding a portion of the optical cable insulated by said insulator, said second rod surrounding a second predetermined length of the optical cable extending from said insulator, said second rod including insulating materials, said insulator separating said first and second rods.

29. The apparatus of claim 28, said insulator not including electrically conductive materials in an interior of said insulator.

30. The apparatus of claim 29, said insulator not including electrically conductive materials on an exterior of said insulator.

31. The apparatus of claim 28, said insulator not including electrically conductive materials on an exterior of said insulator.

32. A method of suspending an optical cable from a pylon, comprising:

connecting a first rod to a first terminal end of an optical cable, the first rod including electrically conductive materials;

connecting the first rod to a pylon to suspend the optical cable from the pylon;

connecting an insulator to the first rod, the insulator insulating the first rod, the insulator surrounding and insulating a first predetermined length of the optical cable; and surrounding a second predetermined length of the optical cable with a second rod, the second predetermined length including at least a portion of the optical cable insulated by the insulator and including a portion of the optical cable extending out from the insulator, the second rod including insulating materials, the insulator separating the first and second rods.

33. The method of claim 32, the insulator not including electrically conductive materials in an interior of the insulator.

34. The method of claim 33, the insulator not including electrically conductive materials on an exterior of the insulator.

35. The method of claim 33, the insulator not including electrically conductive materials on an exterior of the insulator.

36. A method, comprising:

manufacturing an all-dielectric self-supporting optical cable installed on an extra-high voltage electrical power transmitting pylon;

connecting an end of said optical cable with a first armor rod including conductive material to connect said optical cable to the pylon; and insulating said first armor rod connected to said end of said optical cable with an insulating member, surrounding a portion of said optical cable with said insulating member.

37. An apparatus, comprising:

an all-dielectric self-supporting optical cable being installed on an extra-high voltage electrical power transmitting pylon;

a first armor rod including conducting material and being connected to an end of said all-dielectric self-supporting optical cable;

an insulating member insulating said first armor rod; and a second armor rod including insulating material and surrounding a predetermined length of said optical cable, said first armor rod separating said insulating member from said pylon.

38. An apparatus, comprising:

an all-dielectric self-supporting optical cable being installed on an extra-high voltage electrical power transmitting pylon;

a first armor rod including conducting material and being connected to an end of said all-dielectric self-supporting optical cable;

an insulating member insulating said first armor rod; and a second armor rod including insulating material and surrounding a predetermined length of said optical cable, said insulating member surrounding a portion of said optical cable.

39. An apparatus, comprising:

an all-dielectric self-supporting optical cable being installed on an extra-high voltage electrical power transmitting pylon;

a first armor rod including conducting material and being connected to an end of said all-dielectric self-supporting optical cable;

an insulating member insulating said first armor rod; and a second armor rod including insulating material and surrounding a predetermined length of said optical cable, the predetermined length of said optical cable starting from said insulating member.

40. An apparatus, comprising:

an all-dielectric self-supporting optical cable being installed on an extra-high voltage electrical power transmitting pylon;

a first armor rod including conducting material and being connected to an end of said all-dielectric self-supporting optical cable;

an insulating member insulating said first armor rod; and a second armor rod including insulating material and surrounding a predetermined length of said optical cable, said insulating member separating said first armor rod from said second armor rod.

41. An apparatus, comprising:

an all-dielectric self-supporting optical cable being installed on an extra-high voltage electrical power transmitting pylon;

a first armor rod including conducting material and being connected to an end of said all-dielectric self-supporting optical cable;

an insulating member insulating said first armor rod; and a second armor rod including insulating material and surrounding said all-dielectric self-supporting optical cable by a predetermined length starting from an end of a portion of said all-dielectric self-supporting optical cable which is insulated by said insulating member, said second armor rod surrounding said optical cable by being twisted around said optical cable, said insulating member surrounding a portion of said optical cable.

42. An apparatus, comprising:

an all-dielectric self-supporting optical cable being installed on an extra-high voltage electrical power transmitting pylon;

a first armor rod including conducting material and being connected to an end of said all-dielectric self-supporting optical cable;

an insulating member insulating said first armor rod; and a second armor rod including insulating material and surrounding said all-dielectric self-supporting optical cable by a predetermined length starting from an end of a portion of said all-dielectric self-supporting optical cable which is insulated by said insulating member, said second armor rod surrounding said optical cable by being twisted around said optical cable, said insulating member separating said first armor rod from said second armor rod.

43. A method, comprising:

manufacturing an all-dielectric self-supporting optical cable installed on an extra-high voltage electrical power transmitting pylon;

connecting an end of said optical cable with a first armor rod including conductive material to connect said optical cable to the pylon; and insulating said first armor rod connected to said end of said optical cable with an insulating member, said end of said optical cable corresponding to an anchor point of said optical cable, surrounding a portion of said optical cable with said insulating member.

* * * * *